(12) United States Patent  
Hsieh et al.

(10) Patent No.: US 9,346,908 B1
(45) Date of Patent: May 24, 2016

(54) OLEFIN-METATHESIS CATALYSTS AND METHOD FOR PREPARING LOW-MOLECULAR-WEIGHT NITRILE BUTADIENE RUBBER

(71) Applicant: INDUSTRIAL TECHNOLOGY RESEARCH INSTITUTE, Hsinchu (TW)

(72) Inventors: Feng-Ming Hsieh, Tainan (TW); Chun-Yen Chen, Tainan (TW); Mei-Hua Wang, Jhunan Township (TW); Ting-Yao Su, Pingtung (TW); Kuo-Chen Shih, Kaohsiung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 14/700,764

(22) Filed: Apr. 30, 2015

(30) Foreign Application Priority Data

Dec. 25, 2014 (TW) .............................. 103145423 A

(51) Int. Cl.
| | |
|---|---|
| C08F 4/42 | (2006.01) |
| C08F 4/02 | (2006.01) |
| C08C 19/08 | (2006.01) |
| C08F 292/00 | (2006.01) |
| C08F 236/12 | (2006.01) |
| C08F 8/00 | (2006.01) |
| C08C 19/28 | (2006.01) |

(52) U.S. Cl.
CPC ............. *C08F 292/00* (2013.01); *C08C 19/08* (2013.01); *C08C 19/28* (2013.01); *C08F 8/00* (2013.01); *C08F 236/12* (2013.01)

(58) Field of Classification Search
None
See application file for complete search history.

(56) References Cited

U.S. PATENT DOCUMENTS

| | | |
|---|---|---|
| 6,673,881 B2 | 1/2004 | Guérin |
| 6,780,939 B2 | 8/2004 | Guérin et al. |
| 7,381,781 B2 | 6/2008 | Ong et al. |
| 7,470,750 B2 | 12/2008 | Obrecht et al. |
| 7,579,410 B2 | 8/2009 | Guerin |
| 7,585,920 B2 | 9/2009 | Guerin |
| 7,662,889 B2 | 2/2010 | Obrecht et al. |
| 7,737,233 B2 | 6/2010 | Obrecht et al. |
| 7,875,683 B2 | 1/2011 | Obrecht et al. |
| 8,362,154 B2 | 1/2013 | Ong et al. |
| 8,536,277 B2 | 9/2013 | Mueller et al. |
| 8,609,782 B2 | 12/2013 | Obrecht et al. |
| 2012/0329941 A1 | 12/2012 | Ong et al. |
| 2012/0329952 A1 | 12/2012 | Ong et al. |
| 2013/0005916 A1 | 1/2013 | Ong et al. |

FOREIGN PATENT DOCUMENTS

| | | |
|---|---|---|
| CA | 2 350 280 A1 | 12/2002 |
| CA | 2 351 961 A1 | 12/2002 |
| CA | 2 357 465 A1 | 5/2009 |
| CN | 1511855 A | 7/2004 |
| CN | 1922225 A | 2/2007 |
| CN | 1935855 A | 3/2007 |
| CN | 101624428 A | 1/2010 |
| CN | 103272648 A | 9/2013 |
| DE | 10 2005 040 939 A1 | 3/2007 |
| DE | 10 2005 058 834 A1 | 6/2007 |
| EP | 2 027 919 A2 | 2/2009 |
| EP | 2 473 278 B1 | 1/2014 |
| EP | 2 473 281 B1 | 4/2014 |
| EP | 2 473 282 B1 | 4/2014 |
| JP | 2007-224303 A | 9/2007 |
| JP | 2009-046681 A | 3/2009 |
| MX | PA06009368 A | 1/2007 |
| MX | PA06009520 A | 3/2007 |
| MX | 2007010296 A | 10/2008 |
| MX | 2008010685 A | 3/2009 |

(Continued)

OTHER PUBLICATIONS

Byrnes et al., "Electrostatic immobilization of an olefin metathesis pre-catalyst on iron oxide magnetic particles", Green Chemistry, 2012, vol. 14, pp. 81-84.
Che et al., "Magnetic nanoparticle-supported Hoveyda-Grubbs catalysts for ring-closing metathesis reactions", Chemical Communications, 2009, pp. 5990-5992.
Mennecke et al., "Immobilisation of the Grubbs III Olefin Metathesis Catalyst with Polyvinyl Pyridine (PVP)", Synlett, 2005, No. 19, 2948-2952.

(Continued)

*Primary Examiner* — Jeffrey Mullis
(74) *Attorney, Agent, or Firm* — Birch, Stewart, Kolasch & Birch, LLP

(57) ABSTRACT

An olefin-metathesis catalyst is provided. The olefin-metathesis catalyst includes a magnetic carrier, a polymer having formula (I) grafted on the magnetic carrier, and a ruthenium complex loaded on the polymer. A method for preparing low-molecular-weight nitrile butadiene rubber is also provided.

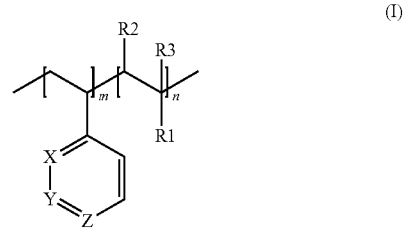

(I)

In formula (I), one of X, Y and Z is nitrogen atom, the others are carbon atoms, R1 and R2, independently, include hydrogen, ester group, C1-10 alkyl group, C3-8 cycloalkyl group, 4-ring to 8-ring heterocycloalkyl or C6-10 aryl group, R3 includes hydrogen or C1-10 alkyl group, m ranges from 10 to 2,000, and n ranges from 0 to 1,000.

15 Claims, 1 Drawing Sheet

(56) References Cited

FOREIGN PATENT DOCUMENTS

| RU | 2 356 913 C2 | 5/2009 |
| TW | I396697 B | 5/2013 |
| TW | 201332653 A1 | 8/2013 |
| TW | 201341405 A | 10/2013 |
| TW | 201343677 A | 11/2013 |

OTHER PUBLICATIONS

Wang et al., "Magnetically Recoverable Ruthenium Catalysts in Organic Synthesis", Molecules, 2014, vol. 19, pp. 4635-4653.

Yinghuai et al., "Magnetic Nanoparticle Supported Second Generation Hoveyda-Grubbs Catalyst for Metathesis of Unsaturated Fatty Acid Esters", Advanced Synthesis & Catalysis, 2009, vol. 351, pp. 2650-2656.

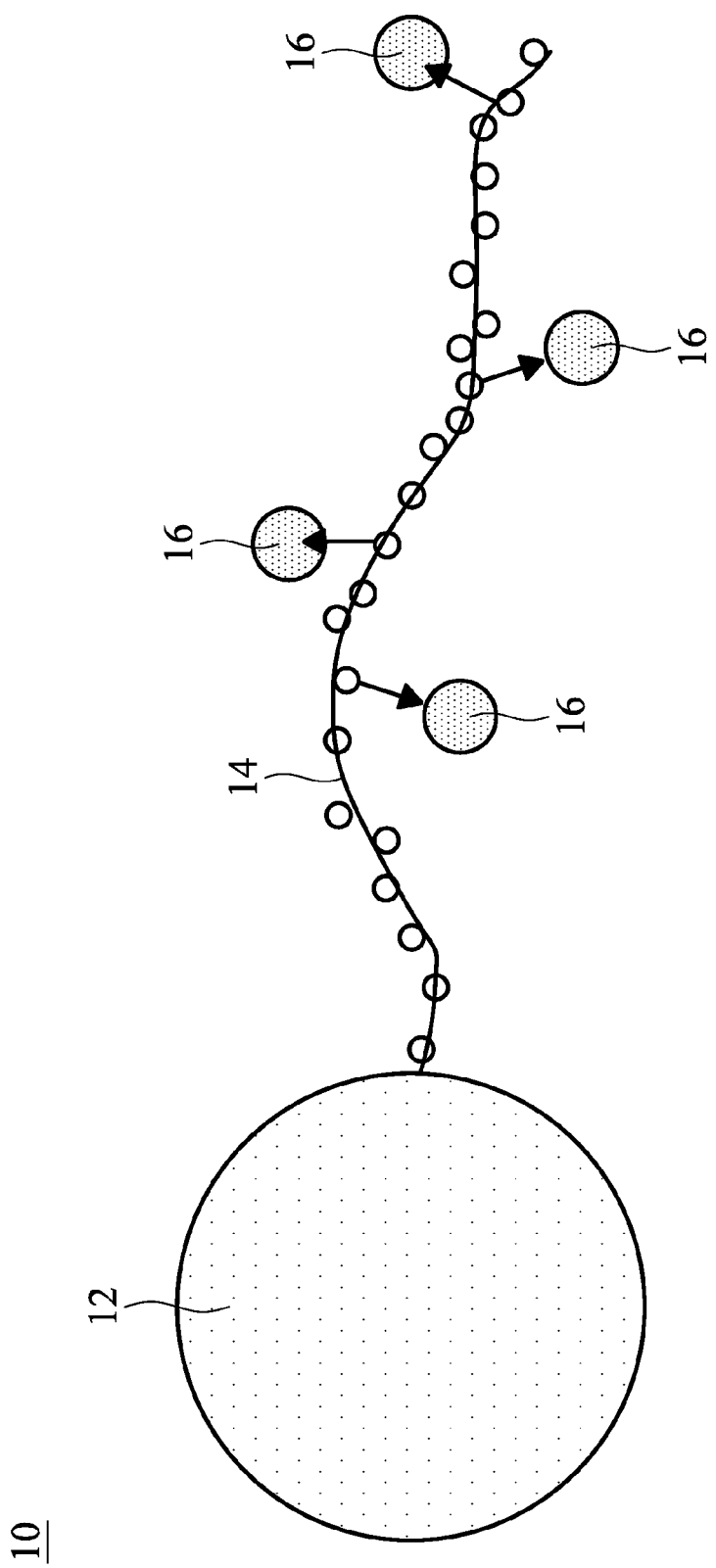

OLEFIN-METATHESIS CATALYSTS AND METHOD FOR PREPARING LOW-MOLECULAR-WEIGHT NITRILE BUTADIENE RUBBER

CROSS REFERENCE TO RELATED APPLICATIONS

This application claims the priority of Taiwan Patent Application No. 103145423, filed on Dec. 25, 2014, the entirety of which is incorporated by reference herein.

TECHNICAL FIELD

The technical field relates to an olefin-metathesis catalyst and a method for preparing low-molecular-weight nitrile butadiene rubber using the same.

BACKGROUND

An olefin-metathesis reaction is a recombination reaction of intramolecular or intermolecular olefin double bonds of reactive molecules under a metal catalyst, and it has been confirmed that it is an essential and important reaction pathway for formation of carbon-carbon bonds in industries such as organic chemistry synthesis, polymers, and pharmaceuticals. Generally, transition metal catalysts utilized in the olefin-metathesis reaction comprise metal complexes of, for example, Ti, Ta, W, Mo, Ru or Os. Especially, a ruthenium complex containing a carbene ligand structure possesses superior catalytic activity, tolerance of functional groups and stability to air and water. Therefore, its development is fairly valued. Such catalysts were first developed by Grubbs and have been commercialized (trade names: for example, Grubbs I, II, III etc.). Other derivative structures of ruthenium complexes have also been developed for meeting the requirements of various olefin-metathesis reactions and are widely applied (trade names: for example, Hoveyda-Grubbs, Neolyst M1, Zhan 1B, nitro-Grela etc.).

Applying the olefin-metathesis reaction as a method for preparing low-molecular-weight nitrile butadiene rubber (NBR) is gradually becoming valued. Generally, hydrogenated nitrile butadiene rubber (HNBR) formed by hydrogenating nitrile butadiene rubber (NBR) is difficult to process further through a rapid injection molding process or a high-efficiency fluid injection molding process due to the doubling of its viscosity which deteriorates the processability of products, limiting its application in precise and complex devices. Viscosity of hydrogenated nitrile butadiene rubber is mainly influenced by its molecular weight. In order to improve the processability of hydrogenated nitrile butadiene rubber, reducing its viscosity is required, that is, appropriately controlling its molecular weight. Compared to conventional violent methods for treating nitrile butadiene rubber, for example mechanical grinding or chemical-acid decomposition, providing an olefin-metathesis catalyst with a specific catalytic activity to participate in the olefin-metathesis reaction of carbon-carbon double bonds in nitrile butadiene rubber molecules is capable of effectively degrading high molecular weight of nitrile butadiene rubber, avoiding deterioration. Also, the processability thereof is improved. Additionally, a narrow polydispersity index (PDI) of nitrile butadiene rubber is obtained, improving the physical properties of vulcanized rubber. The olefin-metathesis reaction of nitrile butadiene rubber is as follows.

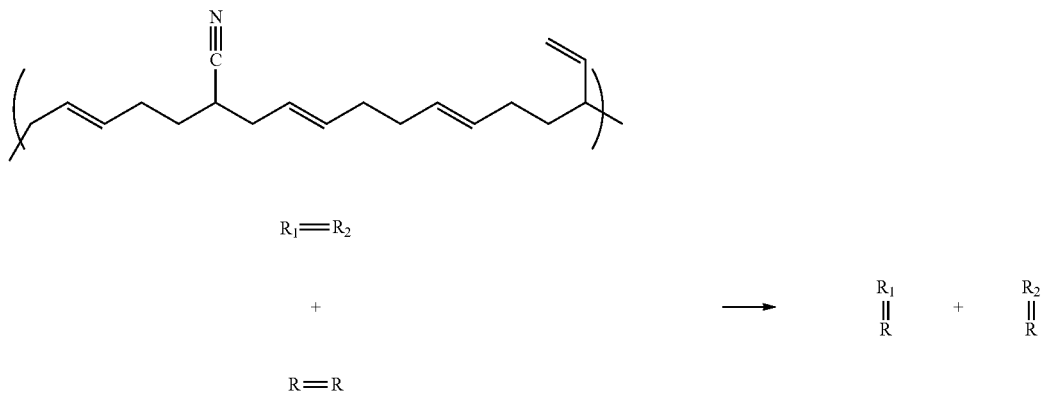

In terms of existing technology, although a homogeneous-phase ruthenium catalyst system utilized in the olefin-metathesis reaction possesses high catalytic activity which is capable of effectively reducing the molecular weight of nitrile butadiene rubber, it is difficult to separate and recover such catalysts after reaction. On the other hand, such expensive catalysts often result in increased production costs. In order to overcome the potential problems of olefin-metathesis catalysts, the technology of loading a catalyst on a heterogeneous-phase carrier has been developed. A ruthenium catalyst with a designed ligand structure is fixed on a carrier to proceed to the olefin-metathesis reaction. In such a method, although the catalyst can be separated and recovered, the synthetic steps of the ligand structure are complex and the costs of raw materials are high, furthermore, the dispersibility and reactivity of the catalyst is pending further improvement. In regard to the nitrile butadiene rubber metathesis reaction system, it is difficult to separate and recover the nano carrier with high dispersibility due to high viscosity of reaction solution. Such problems can be improved by diluting the reaction solution. However, using large amounts of solvent is required, causing environmental pollution and increased treatment costs. Therefore, for relevant industries, the development of a low-cost catalyst system with high reactivity and capable of being easily separated and recovered to resolve the problems derived from applying the olefin-metathesis reaction to prepare low-molecular-weight nitrile butadiene rubber is desirable.

SUMMARY

In accordance with one embodiment of the disclosure, an olefin-metathesis catalyst is provided. The olefin-metathesis catalyst comprises a magnetic carrier, a polymer having formula (I) grafted on the magnetic carrier, and a ruthenium complex loaded on the polymer.

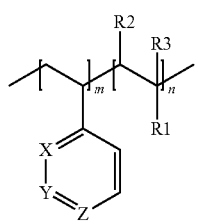
(I)

In formula (I), one of X, Y and Z is nitrogen atom, and the others are carbon atoms. R1 and R2, independently, comprise hydrogen, ester group, C1-10 alkyl group, C3-8 cycloalkyl group, 4-ring to 8-ring heterocycloalkyl or C6-10 aryl group. R3 comprises hydrogen or C1-10 alkyl group, and m ranges from 10 to 2,000 and n ranges from 0 to 1,000.

In accordance with another embodiment of the disclosure, a method for preparing low-molecular-weight nitrile butadiene rubber is provided. The preparation method comprises providing a first nitrile butadiene rubber solution, and adding an olefin compound and the disclosed olefin-metathesis catalyst to the first nitrile butadiene rubber solution to react to prepare a second nitrile butadiene rubber.

A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawings, wherein:

FIG. 1 is a structural schematic diagram of an olefin-metathesis catalyst in accordance with one embodiment of the disclosure.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are shown schematically in order to simplify the drawing.

Referring to FIG. 1, in accordance with one embodiment of the disclosure, an olefin-metathesis catalyst is provided. The olefin-metathesis catalyst 10 comprises a magnetic carrier 12, a polymer 14, and a ruthenium complex 16. The polymer 14 has the following formula (I) and is grafted on the magnetic carrier 12. The ruthenium complex 16 is loaded on the polymer 14.

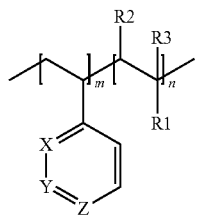
(I)

In formula (I), one of X, Y and Z may be nitrogen atom, and the others may be carbon atoms. R1 and R2 may, independently, comprise hydrogen, ester group, C1-10 alkyl group, C3-8 cycloalkyl group, 4-ring to 8-ring heterocycloalkyl or C6-10 aryl group. R3 may comprise hydrogen or C1-10 alkyl group, and m ranges from about 10 to 2,000 and n ranges from about 0 to 1,000.

The magnetic carrier 12 may comprise iron oxide, cobalt oxide or nickel oxide. The magnetic carrier 12 may have a surface containing double-bond functional groups. The magnetic carrier 12 has a diameter ranging from about 50 nm to 100 nm.

The disclosed magnetic carrier is a surface-modified nano magnetic particle. The nano magnetic particle may be nano iron oxide ($Fe_3O_4$) or its complex. Specific functional groups capable of participating in polymerization served as a connecting structure for polymer grafting are formed on the surface of the magnetic particle through surface modification technology (for example, using a silane coupling agent to proceed to a surface treatment). The magnetic carrier has a high specific surface area and facilitates a loaded-type catalyst being easily separated and recovered. Especially for the high-viscosity reaction system which is difficult to carry out filtration or centrifugation treatment, the catalyst can be more effectively recovered using the disclosed magnetic separation method.

The polymer 14 has a weight-average molecular weight ranging from about 1,000 to 300,000. In one embodiment, the polymer 14 may comprise vinyl pyridine polymers or copolymers thereof.

The disclosed polymer grafted on the magnetic carrier may be vinyl pyridine polymers or copolymers of vinyl pyridine and monomers inert to metal-ligands. The polymer is grafted on the magnetic carrier through various reactions, for example, atom transfer radical polymerization (ATRP), reversible addition-fragmentation chain-transfer polymerization (RAFT), ring-opening polymerization (ROP), free-radical polymerization, anionic/cationic polymerization or condensation polymerization. Among such reactions, the surface-functionalized nano magnetic particle with free radicals is capable of proceeding to an addition reaction with the monomers of the polymer to graft the polymer on the surface thereof. The grafting between the polymer and the magnetic carrier is completed through such similar reactions, whether a polymer with active free radicals is first synthesized and then reacted with a carrier, or monomers of a polymer are directly reacted with a carrier through a free-radical reaction.

The ruthenium complex 16 has a ligand comprising, for example, tricyclohexylphosphine, nitrogen-containing heterocyclic carbene, pyridine or a derivative thereof.

The ruthenium complex is an organometallic catalyst with a catalytic activity for olefin-metathesis reaction, including commercial catalysts (trade name: for example, Grubbs, Hoveyda-Grubbs, Neolyst M1, Zhan 1B, nitro-Grelaor etc.) or a derivative thereof. Ruthenium is capable of forming a coordination bonding with, for example, a pyridine structure, and being loaded on the polymer containing pyridine structures.

Specifically, the magnetic carrier 12 has a grafting amount of the polymer 14 ranging from about 10 wt % to 50 wt % based on the total weight of the magnetic carrier 12 and the polymer 14.

Additionally, the polymer 14 has a loading amount of the ruthenium complex 16 ranging from about 1 wt % to 10 wt % based on the total weight of the magnetic carrier 12 and the polymer 14.

In accordance with another embodiment of the disclosure, a method for preparing low-molecular-weight nitrile butadiene rubber (NBR) comprising the following steps is provided. First, a first nitrile butadiene rubber solution is provided. An olefin compound and an olefin-metathesis catalyst are then added to the first nitrile butadiene rubber solution to react to prepare a second nitrile butadiene rubber.

The first nitrile butadiene rubber solution has a solid content ranging from about 3 wt % to 12 wt %.

In some embodiments, the olefin compound may comprise 1-hexene, ethylene, propylene or butadiene.

The structure of the olefin-metathesis catalyst is illustrated in FIG. 1. The olefin-metathesis catalyst 10 comprises a magnetic carrier 12, a polymer 14, and a ruthenium complex 16. The polymer 14 has the following formula (I) and is grafted on the magnetic carrier 12. The ruthenium complex 16 is loaded on the polymer 14.

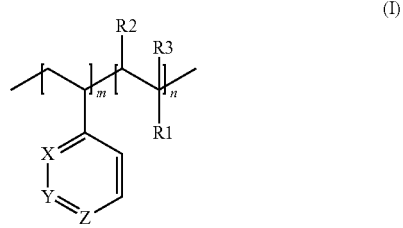

(I)

In formula (I), one of X, Y and Z may be nitrogen atom, and the others may be carbon atoms. R1 and R2 may, independently, comprise hydrogen, ester group, C1-10 alkyl group, C3-8 cycloalkyl group, 4-ring to 8-ring heterocycloalkyl or C6-10 aryl group. R3 may comprise hydrogen or C1-10 alkyl group, and m ranges from about 10 to 2,000 and n ranges from about 0 to 1,000.

The magnetic carrier 12 may comprise iron oxide, cobalt oxide or nickel oxide. The magnetic carrier 12 may have a surface containing double-bond functional groups. The magnetic carrier 12 has a diameter ranging from about 50 nm to 100 nm.

The polymer 14 has a weight-average molecular weight ranging from about 1,000 to 300,000. In one embodiment, the polymer 14 may comprise vinyl pyridine polymers or copolymers thereof.

The ruthenium complex 16 has a ligand comprising, for example, tricyclohexylphosphine, nitrogen-containing heterocyclic carbene, pyridine or a derivative thereof.

Specifically, the magnetic carrier 12 has a grafting amount of the polymer 14 ranging from about 10 wt % to 50 wt % based on the total weight of the magnetic carrier 12 and the polymer 14.

Additionally, the polymer 14 has a loading amount of the ruthenium complex 16 ranging from about 1 wt % to 10 wt % based on the total weight of the magnetic carrier 12 and the polymer 14.

In some embodiments, the olefin-metathesis catalyst has an adding ratio ranging from about 0.1 wt % to 10 wt % based on the solid content of the first nitrile butadiene rubber solution.

In some embodiments, the olefin compound has an adding ratio ranging from about 0.1 wt % to 10 wt % based on the solid content of the first nitrile butadiene rubber solution.

The second nitrile butadiene rubber has a molecular weight ranging from about 10,000 to 100,000.

The disclosed method for preparing low-molecular-weight nitrile butadiene rubber (NBR) may further comprise recovering the olefin-metathesis catalyst using a magnet.

The problem of poor dispersibility of a heterogeneous-phase catalyst in nitrile butadiene rubber solution is resolved using the disclosed loaded-type olefin-metathesis catalyst. Such a catalyst exhibits high reactivity, the same as a homogeneous-phase catalyst, and is easily separated from the nitrile butadiene rubber solution, recovered and reused, reducing the production costs. Compared to a conventional loaded-type olefin-metathesis catalyst, no synthesis of complex ligands is required in the disclosure. Additionally, the amount of the ruthenium complex coordinating with the polymer is controlled by adjusting the ratio of vinyl pyridine monomers in the polymer. In terms of reaction systems with various solvents, the grafted polymer is well dissolved in various solvents due to copolymerizing with various inert monomers. When the polymer is grafted on the surface of the carrier, its molecular chain is capable of extending to a homogeneous-phase solvent system, facilitating dispersion of the carrier in the solvent. Therefore, such a catalyst exhibits a catalytic activity that is the same as a homogeneous-phase reaction system and the catalyst connecting the heterogeneous-phase carrier is easily separated from the reaction system, recovered and reused. On a concrete application, the disclosed catalyst is suitable for catalyzing, separating and reusing in a high-viscosity reaction system, for example, applying to the nitrile butadiene rubber olefin-metathesis reaction to prepare low-molecular-weight nitrile butadiene rubber.

EXAMPLES

Example 1

Synthesis of the Polymer (Vinyl Pyridine-Styrene Copolymer) in the Olefin-Metathesis Catalyst

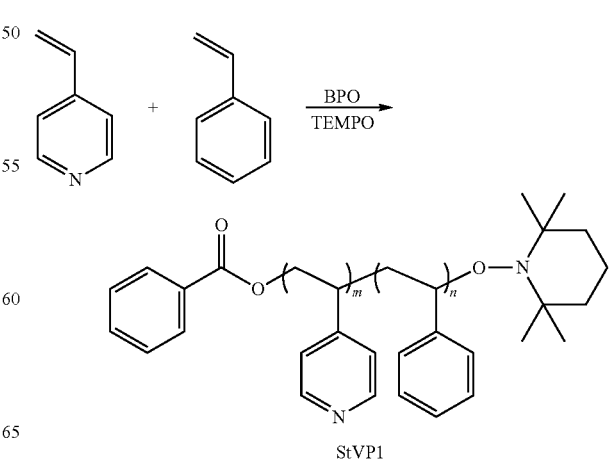

StVP1

0.9 g of 2,2,6,6-tetramethylpiperidine-1-oxyl (TEMPO) (5.76 mmol), 1.16 g of benzoyl peroxide (BPO) (4.8 mmol), 8.4 g of 4-vinyl pyridine (80 mmol) and 41.6 g of styrene (400 mmol) were added to a 500-mL round-bottomed reaction flask with uniform stirring to form a solution. After removal of oxygen gas from the solution by conducting nitrogen gas, the solution was reacted for three hours at 95° C. and its color gradually became dark red-brown. The reaction temperature was then raised to 130° C. The solution was continuously reacted for 16 hours until the solution was sticky. After the reaction was completed, 1,000 mL of methanol was added to the solution to remove oxygen gas therefrom, and then a polymer was precipitated. After filtration, a solid was dried at 45° C. overnight in a vacuum environment. 35 g of StVP1 polymer was thus obtained. The weight-average molecular weight of the polymer was analyzed by gel permeation chromatography (GPC) and was 13,894. The polydispersity index (PDI) of the polymer was 1.3. The content of 4-vinyl pyridine in the polymer was analyzed by nuclear magnetic resonance spectrometer ($^1$H NMR) and was 25 mol %.

Example 2

Surface Modification of the Magnetic Carrier in the Olefin-Metathesis Catalyst and Polymer Grafting (I)

0.5 g of nano iron oxide ($Fe_3O_4$, 50-100 nm) and 5 g of 3-(trimethoxysilyl)propyl methacrylate were added to a reaction flask containing 20 mL of toluene with uniform stirring under nitrogen gas to form a solution. After the solution was reacted for 12 hours with thermal-reflux, the solution was cooled. A solid was then attracted out of the solution by a magnet and washed with toluene three times. The remaining solution was poured off. The solid was then dried in vacuum. Surface-functionalized nano iron oxide (m-$Fe_3O_4$) was thus obtained.

0.4 g of m-$Fe_3O_4$ and 4 g of StVP1 polymer prepared by Example 1 were added to a reaction flask containing 40 mL of xylene with uniform stirring to form a solution. After removal of oxygen gas from the solution by conducting nitrogen gas, the solution was reacted for 24 hours at 130° C. After the reaction was completed, the solution was left to stand and cooled at room temperature. A solid was then attracted out of the solution by a magnet and washed with THF three times. The remaining solution was poured off. The solid was then dried in vacuum. 0.42 g of black Fe-StVP1 solid powder was thus obtained. The product of Fe-StVP1 was analyzed by thermogravimetric analyzer (TGA) and a polymer grafting amount of the nano iron oxide was 25 wt %.

Example 3

Surface Modification of the Magnetic Carrier in the Olefin-Metathesis Catalyst and Polymer Grafting (II)

40 mg of 2,2,6,6-tetramethylpiperidine-1-oxyl (TEMPO) (0.26 mmol), 46 mg of benzoyl peroxide (BPO) (0.19 mmol), 0.42 g of 4-vinyl pyridine (4 mmol), 1.66 g of styrene (16 mmol) and 0.1 g of m-Fe3O4 were added to a reaction flask with uniform stirring to form a solution. After removal of oxygen gas from the solution by conducting nitrogen gas, the solution was reacted for three hours at 95° C. The reaction temperature was then raised to 130° C. The solution was continuously reacted for 18 hours. After the reaction was completed, the solution was left to stand and cooled at room temperature. A solid was then attracted out of the solution by a magnet and washed with THF three times. The remaining solution was poured off. The solid was then dried in vacuum. 0.11 g of black Fe-StVP2 solid powder was thus obtained. The product of Fe-StVP2 was analyzed by thermogravimetric analyzer (TGA) and a polymer grafting amount of the nano iron oxide was 38 wt %.

Example 4

Loading Reaction of the Ruthenium Complex in the Olefin-Metathesis Catalyst (I)

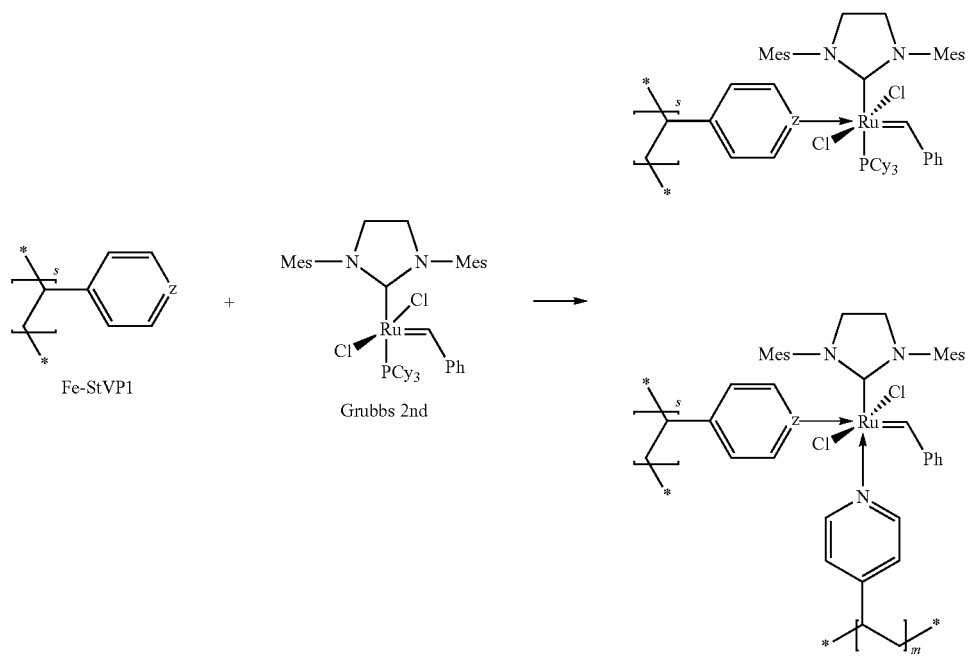

Under a glovebox, 0.1 g of Fe-StVP1 and 5 mg of Grubbs second-generation catalyst were added to a reaction flask containing 10 mL of dichloromethane with uniform stirring at room temperature and reacted for 24 hours to form a solution. After the reaction was completed, a solid was attracted out of the reaction solution by a magnet and washed with dichloromethane to obtain a loaded-type Grubbs second-generation catalyst (Fe-StVP1-GII). A washing solution was left. The foregoing reaction solution and the washing solution were then collected, concentrated and appropriately diluted to form a diluted solution. The characteristic absorption spectrum (Ru d-d transition, $\lambda_{max}$=336 nm) of non-loaded Grubbs second-generation catalyst in the diluted solution was then analyzed by a UV/visible (UV/VIS) spectrometer and a loading amount of the Grubbs second-generation catalyst was 2.68 wt %.

Example 5

Loading Reaction of the Ruthenium Complex in the Olefin-Metathesis Catalyst (II)

Under a glovebox, 0.1 g of Fe-StVP2 and 5 mg of Grubbs second-generation catalyst were added to a reaction flask containing 10 mL of dichloromethane with uniform stirring at room temperature and reacted for 24 hours to form a solution. After the reaction was completed, a solid was attracted out of the reaction solution by a magnet and washed with dichloromethane to obtain a loaded-type Grubbs second-generation catalyst (Fe-StVP2-GII). A washing solution was left. The foregoing reaction solution and the washing solution were then collected, concentrated and appropriately diluted to form a diluted solution. The characteristic absorption spectrum (Ru d-d transition, $\lambda_{max}$=336 nm) of non-loaded Grubbs second-generation catalyst in the diluted solution was then analyzed by a UV/visible (UV/VIS) spectrometer and a loading amount of the Grubbs second-generation catalyst was 3.64 wt %.

Example 6

Loading Reaction of the Ruthenium Complex in the Olefin-Metathesis Catalyst (III)

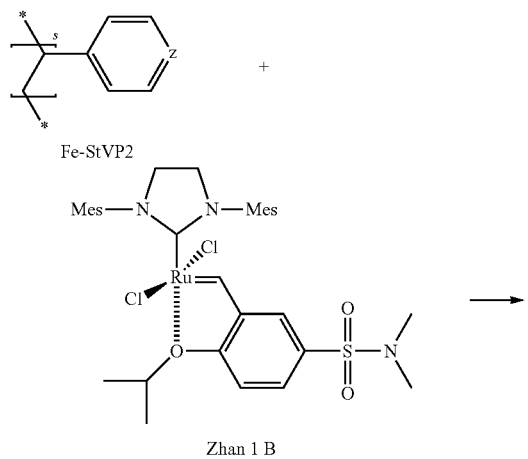

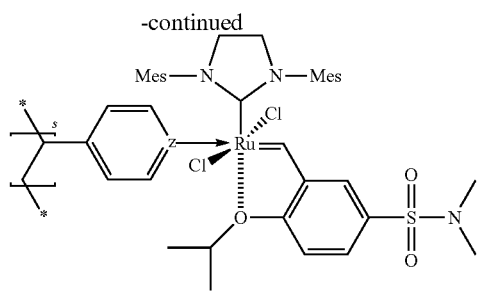

Under a glovebox, 0.1 g of Fe-StVP2 and 5 mg of Zhan 1B catalyst were added to a reaction flask containing 10 mL of dichloromethane with uniform stirring at room temperature and reacted for 24 hours to form a solution. After the reaction was completed, a solid was attracted out of the reaction solution by a magnet and washed with dichloromethane to obtain a loaded-type Zhan 1B catalyst (Fe-StVP2-Z1). A washing solution was left. The foregoing reaction solution and the washing solution were then collected, concentrated and appropriately diluted to form a diluted solution. The characteristic absorption spectrum (Ru d-d transition, $\lambda_{max}$=377 nm) of non-loaded Zhan 1B catalyst in the diluted solution was then analyzed by a UV/visible (UV/VIS) spectrometer and a loading amount of the Zhan 1B catalyst was 3.85 wt %.

Example 7

Preparation of the Low-Molecular-Weight Nitrile Butadiene Rubber (NBR) and Catalyst Recovering Test (I)

A nitrile butadiene rubber (acrylonitrile content: 38 mol %)/chlorobenzene solution with a solid content of 6 wt % was prepared in a reaction flask filled with nitrogen gas. 2 wt % (relative to the solid content of the nitrile butadiene rubber solution) of 1-hexene as a co-olefin and 5 wt % (relative to the solid content of the nitrile butadiene rubber solution) of a loaded-type olefin-metathesis catalyst Fe-StVP1-GII (prepared by Example 4) were then added to the nitrile butadiene rubber solution in order with uniform stirring and reacted for two hours at room temperature. Low-molecular-weight nitrile butadiene rubber (NBR) was then prepared.

After the reaction was completed, the catalyst was separated from the reaction solution by a magnet. The reaction solution was added to methanol to precipitate nitrile butadiene rubber. After filtration, the nitrile butadiene rubber was dried overnight at 45° C. in a vacuum environment. The weight-average molecular weight of the nitrile butadiene rubber was analyzed by gel permeation chromatography (GPC). After washing the recovered catalyst by chlorobenzene to remove residual nitrile butadiene rubber, the steps of reacting, separating, recovering and reusing were repeated five times. The weight-average molecular weight and polydispersity index (PDI) of the resulting nitrile butadiene rubber (product) and the degradation rate of the nitrile butadiene rubber (starting material) are shown in Table 1.

TABLE 1

| Nitrile butadiene rubber (NBR) | Before reaction | Round 1 | Round 2 | Round 3 | Round 4 | Round 5 |
|---|---|---|---|---|---|---|
| Molecular weight (Mw) | 126,049 | 45,925 | 53,794 | 60,216 | 65,745 | 72,893 |

TABLE 1-continued

| Nitrile butadiene rubber (NBR) | Before reaction | Round 1 | Round 2 | Round 3 | Round 4 | Round 5 |
|---|---|---|---|---|---|---|
| Polydispersity index (PDI) | 1.98 | 1.61 | 1.69 | 1.71 | 1.77 | 1.82 |
| Degradation rate (%) | — | 63.6 | 57.3 | 52.2 | 47.8 | 42.2 |

Example 8

Preparation of the Low-Molecular-Weight Nitrile Butadiene Rubber (NBR) and Catalyst Recovering Test (II)

A nitrile butadiene rubber (acrylonitrile content: 38 mol %)/chlorobenzene solution with a solid content of 6 wt % was prepared in a reaction flask filled with nitrogen gas. 2 wt % (relative to the solid content of the nitrile butadiene rubber solution) of 1-hexene as a co-olefin and 5 wt % (relative to the solid content of the nitrile butadiene rubber solution) of a loaded-type olefin-metathesis catalyst Fe-StVP2-GII (prepared by Example 5) were then added to the nitrile butadiene rubber solution in order with uniform stirring and reacted for two hours at room temperature. Low-molecular-weight nitrile butadiene rubber (NBR) was then prepared.

After the reaction was completed, the catalyst was separated from the reaction solution by a magnet. The reaction solution was added to methanol to precipitate nitrile butadiene rubber. After filtration, the nitrile butadiene rubber was dried overnight at 45° C. in a vacuum environment. The weight-average molecular weight of the nitrile butadiene rubber was analyzed by gel permeation chromatography (GPC). After washing the recovered catalyst by chlorobenzene to remove residual nitrile butadiene rubber, the steps of reacting, separating, recovering and reusing were repeated five times. The weight-average molecular weight and polydispersity index (PDI) of the resulting nitrile butadiene rubber (product) and the degradation rate of the nitrile butadiene rubber (starting material) are shown in Table 2.

TABLE 2

| Nitrile butadiene rubber (NBR) | Before reaction | Round 1 | Round 2 | Round 3 | Round 4 | Round 5 |
|---|---|---|---|---|---|---|
| Molecular weight (Mw) | 126,049 | 41,583 | 47,955 | 52,486 | 58,725 | 64,163 |
| Polydispersity index (PDI) | 1.98 | 1.59 | 1.65 | 1.69 | 1.75 | 1.80 |
| Degradation rate (%) | — | 67.0 | 62.0 | 58.4 | 53.4 | 49.1 |

Example 9

Preparation of the Low-Molecular-Weight Nitrile Butadiene Rubber (NBR) and Catalyst Recovering Test (III)

A nitrile butadiene rubber (acrylonitrile content: 38 mol %)/chlorobenzene solution with a solid content of 6 wt % was prepared in a reaction flask filled with nitrogen gas. 2 wt % (relative to the solid content of the nitrile butadiene rubber solution) of 1-hexene as a co-olefin and 5 wt % (relative to the solid content of the nitrile butadiene rubber solution) of a loaded-type olefin-metathesis catalyst Fe-StVP2-Z1 (prepared by Example 6) were then added to the nitrile butadiene rubber solution in order with uniform stirring and reacted for two hours at room temperature. Low-molecular-weight nitrile butadiene rubber (NBR) was then prepared.

After the reaction was completed, the catalyst was separated from the reaction solution by a magnet. The reaction solution was added to methanol to precipitate nitrile butadiene rubber. After filtration, the nitrile butadiene rubber was dried overnight at 45° C. in a vacuum environment. The weight-average molecular weight of the nitrile butadiene rubber was analyzed by gel permeation chromatography (GPC). After washing the recovered catalyst by chlorobenzene to remove residual nitrile butadiene rubber, the steps of reacting, separating, recovering and reusing were repeated five times. The weight-average molecular weight and polydispersity index (PDI) of the resulting nitrile butadiene rubber (product) and the degradation rate of the nitrile butadiene rubber (starting material) are shown in Table 3.

TABLE 3

| Nitrile butadiene rubber (NBR) | Before reaction | Round 1 | Round 2 | Round 3 | Round 4 | Round 5 |
|---|---|---|---|---|---|---|
| Molecular weight (Mw) | 126,049 | 39,054 | 43,328 | 50,019 | 54,717 | 60,992 |
| Polydispersity index (PDI) | 1.98 | 1.61 | 1.64 | 1.70 | 1.72 | 1.79 |
| Degradation rate (%) | — | 69.0 | 65.6 | 60.3 | 56.6 | 51.6 |

The results in Tables 1-3 indicate that the degradation of nitrile butadiene rubber molecules is effectively improved to form low-molecular-weight nitrile butadiene rubber using the disclosed loaded-type catalyst to participate in an olefin-metathesis reaction of nitrile butadiene rubber. The catalyst is recovered from a high-viscosity nitrile butadiene rubber reaction solution through a simple magnetic separation method. The recovered catalyst is also reused and still possesses a certain-degree catalytic activity such that the molecular weight of nitrile butadiene rubber is effectively reduced.

Comparative Example 1

Preparation of Low-Molecular-Weight Nitrile Butadiene Rubber (NBR) Using a Commercially Available Catalyst and Catalyst Recovering Test A nitrile butadiene rubber (acrylonitrile content: 38 mol %)/chlorobenzene solution with a solid content of 6 wt % was prepared in a reaction flask filled with nitrogen gas. 2 wt % (relative to the solid content of the nitrile butadiene rubber solution) of 1-hexene as a co-olefin and a commercially available loaded-type olefin-metathesis catalyst RC-402 (e.g., Zhan 1B catalyst being directly loaded on the polymer carrier, purchased from Strem Chemicals—Catalog #44-0083) with the same amount of the ruthenium catalyst of Example 9 were then added to the nitrile butadiene rubber solution in order with uniform stirring and reacted for two hours at room temperature. Low-molecular-weight nitrile butadiene rubber (NBR) was then prepared.

After the reaction was completed, the catalyst was separated from the reaction solution through filtration. The reaction solution was added to methanol to precipitate nitrile butadiene rubber. After filtration, the nitrile butadiene rubber was dried overnight at 45° C. in a vacuum environment. The weight-average molecular weight of the nitrile butadiene rubber was analyzed by gel permeation chromatography (GPC). After washing the recovered catalyst by chlorobenzene to remove residual nitrile butadiene rubber, the steps of reacting, separating, recovering and reusing were repeated five times. The weight-average molecular weight and polydispersity index (PDI) of the resulting nitrile butadiene rubber (product) and the degradation rate of the nitrile butadiene rubber (starting material) are shown in Table 4.

TABLE 4

| Nitrile butadiene rubber (NBR) | Before reaction | Round 1 | Round 2 | Round 3 | Round 4 | Round 5 |
|---|---|---|---|---|---|---|
| Molecular weight (Mw) | 126,049 | 66,190 | 71,190 | 78,515 | 87,681 | 95,178 |
| Polydispersity index (PDI) | 1.98 | 1.81 | 1.79 | 1.88 | 1.85 | 1.86 |
| Degradation rate (%) | — | 47.5 | 43.5 | 37.7 | 30.4 | 24.5 |

The results in Table 4 indicate that the dispersibility of the catalyst is reduced due to poor compatibility between the commercially available loaded-type catalyst and the reaction solution. Furthermore, the active center of the catalyst is limited within the surface of the carrier, incapable of extending further to a homogeneous-phase reaction system, resulting in poor reactivity. The degradation rate of the nitrile butadiene rubber molecules is less than 50%.

With the same amount of the ruthenium catalyst of Comparative Example 1, the degradation rate after round one of Example 9 achieves near 70%. After recovering and reusing five rounds, the degradation rate still achieves above 50%. Therefore, in addition to achievement of high reactivity, the disclosed loaded-type olefin-metathesis catalyst is also easily separated, recovered and reused.

It will be apparent to those skilled in the art that various modifications and variations can be made to the disclosed embodiments. It is intended that the specification and examples be considered as exemplary only, with the true scope of the disclosure being indicated by the following claims and their equivalents.

What is claimed is:

1. An olefin-metathesis catalyst, comprising:
   a magnetic carrier;
   a polymer having formula (I) grafted on the magnetic carrier,

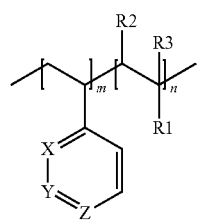

(I)

wherein one of X, Y and Z is nitrogen atom, the others are carbon atoms, R1 and R2, independently, comprise hydrogen, ester group, C1-10 alkyl group, C3-8 cycloalkyl group, 4-ring to 8-ring heterocycloalkyl or C6-10 aryl group, R3 comprises hydrogen or C1-10 alkyl group, m ranges from 10 to 2,000, and n ranges from 0 to 1,000; and
   a ruthenium complex loaded on the polymer.

2. The olefin-metathesis catalyst as claimed in claim 1, wherein the magnetic carrier comprises iron oxide, cobalt oxide or nickel oxide.

3. The olefin-metathesis catalyst as claimed in claim 1, wherein the magnetic carrier has a surface containing double-bond functional groups.

4. The olefin-metathesis catalyst as claimed in claim 1, wherein the magnetic carrier has a diameter ranging from 50 nm to 100 nm.

5. The olefin-metathesis catalyst as claimed in claim 1, wherein the polymer has a weight-average molecular weight ranging from 1,000 to 300,000.

6. The olefin-metathesis catalyst as claimed in claim 1, wherein the ruthenium complex has a ligand comprising tricyclohexylphosphine, nitrogen-containing heterocyclic carbene, pyridine or a derivative thereof.

7. The olefin-metathesis catalyst as claimed in claim 1, wherein the magnetic carrier has a grafting amount of the polymer ranging from 10 wt % to 50 wt % based on the total weight of the magnetic carrier and the polymer.

8. The olefin-metathesis catalyst as claimed in claim 1, wherein the polymer has a loading amount of the ruthenium complex ranging from 1 wt % to 10 wt % based on the total weight of the magnetic carrier and the polymer.

9. A method for preparing low-molecular-weight nitrile butadiene rubber, comprising:
   providing a first nitrile butadiene rubber solution; and
   adding an olefin compound and an olefin-metathesis catalyst as claimed in claim 1 to the first nitrile butadiene rubber solution to react to prepare a second nitrile butadiene rubber.

10. The method for preparing low-molecular-weight nitrile butadiene rubber as claimed in claim 9, wherein the first nitrile butadiene rubber solution has a solid content ranging from 3 wt % to 12 wt %.

11. The method for preparing low-molecular-weight nitrile butadiene rubber as claimed in claim 9, wherein the olefin compound comprises 1-hexene, ethylene, propylene or butadiene.

12. The method for preparing low-molecular-weight nitrile butadiene rubber as claimed in claim 10, wherein the olefin-metathesis catalyst has an adding ratio ranging from 0.1 wt % to 10 wt % based on the solid content of the first nitrile butadiene rubber solution.

13. The method for preparing low-molecular-weight nitrile butadiene rubber as claimed in claim 10, wherein the olefin compound has an adding ratio ranging from 0.1 wt % to 10 wt % based on the solid content of the first nitrile butadiene rubber solution.

14. The method for preparing low-molecular-weight nitrile butadiene rubber as claimed in claim 9, wherein the second nitrile butadiene rubber has a molecular weight ranging from 10,000 to 100,000.

15. The method for preparing low-molecular-weight nitrile butadiene rubber as claimed in claim 9, further comprising recovering the olefin-metathesis catalyst using a magnet.

* * * * *